(No Model.) 3 Sheets—Sheet 1.
E. P. DECKER.
RECORDING SPEED INDICATOR.
No. 586,961. Patented July 27, 1897.
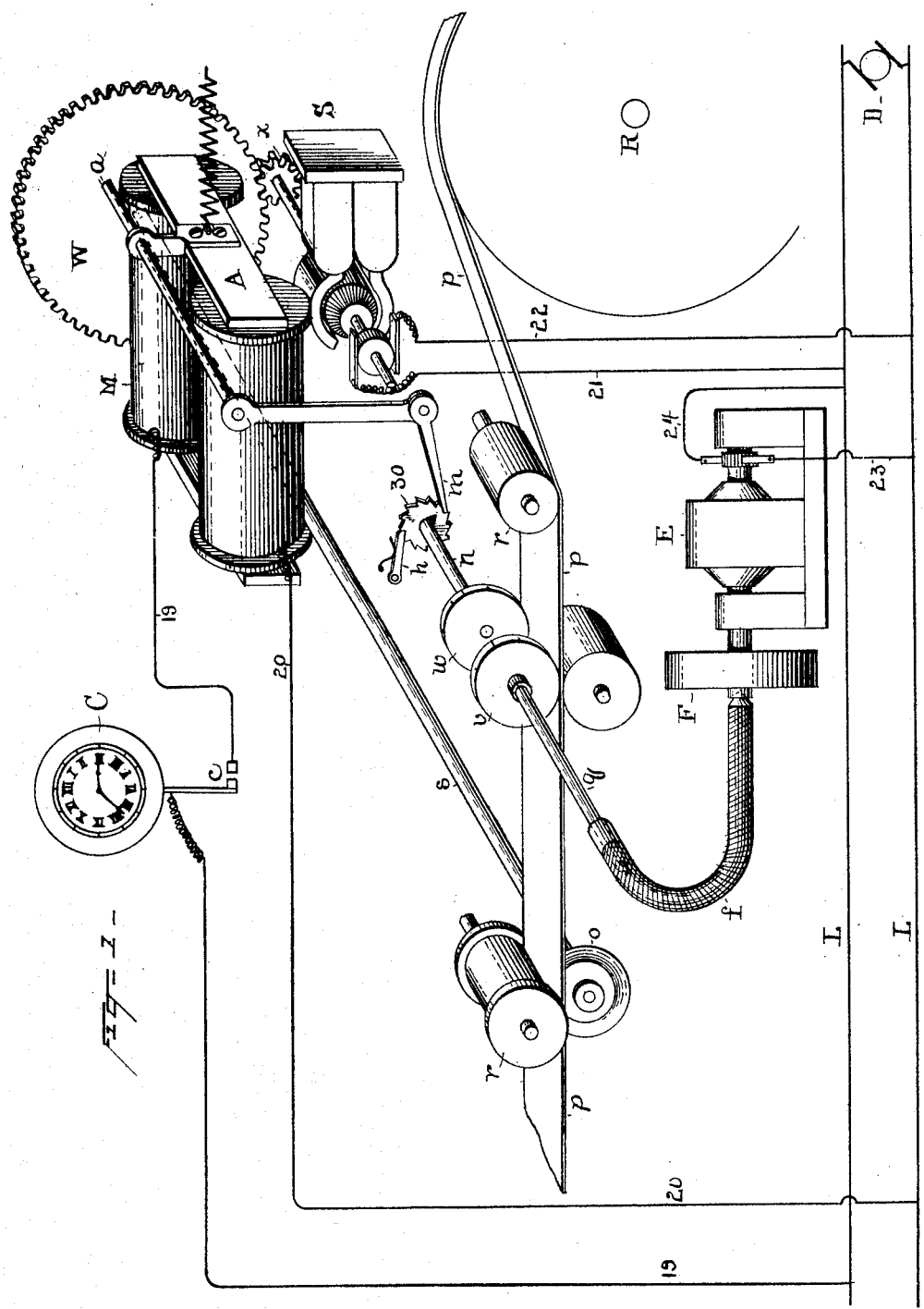

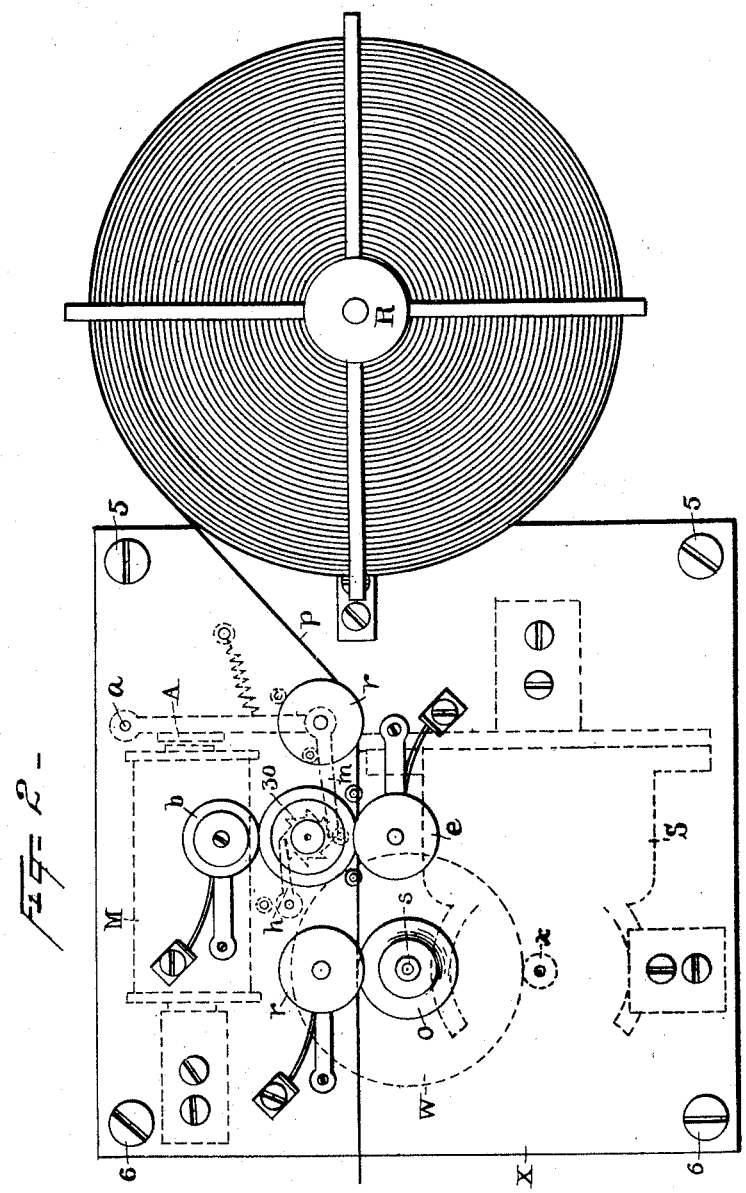

(No Model.) 3 Sheets—Sheet 3.
E. P. DECKER.
RECORDING SPEED INDICATOR.
No. 586,961. Patented July 27, 1897.
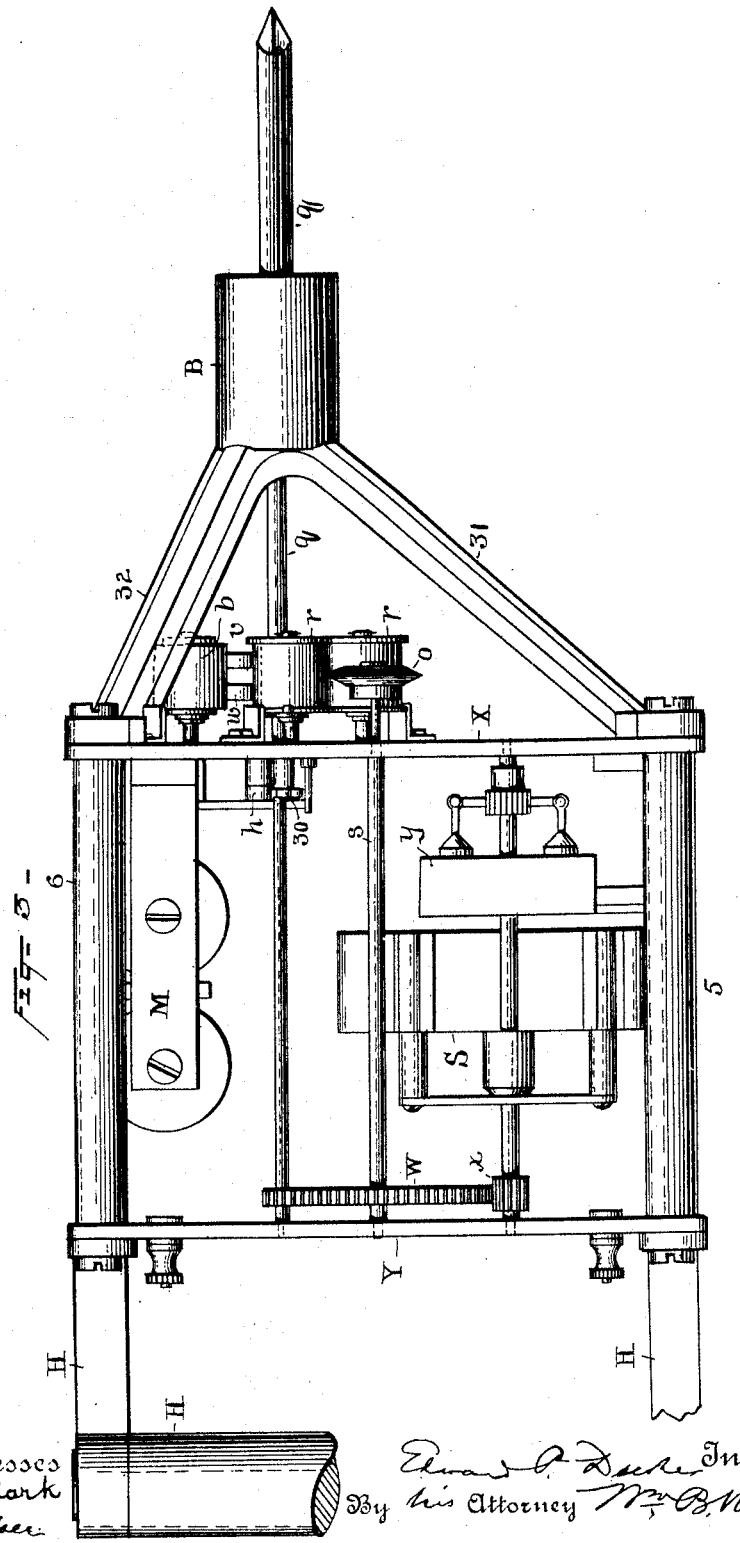

UNITED STATES PATENT OFFICE.

EDWARD P. DECKER, OF BROOKLYN, NEW YORK.

RECORDING SPEED-INDICATOR.

SPECIFICATION forming part of Letters Patent No. 586,961, dated July 27, 1897.

Application filed April 7, 1897. Serial No. 631,074. (No model.)

*To all whom it may concern:*

Be it known that I, EDWARD P. DECKER, a citizen of the United States, and a resident of Brooklyn, in the county of Kings and State of New York, have made certain new and useful Improvements in Recording Speed-Indicators, of which the following is a specification.

My invention is an improvement in apparatus for recording the speed of moving machinery, as the revolutions of an electric-motor armature.

The object of my invention is to make a record which shall indicate at a glance and without computation how many revolutions or movements per unit of time are performed by any machine or apparatus, as in the case of a wheel or shaft when rotating, and to do this by means of a small, portable, compact, cheap, and simple instrument easily transported and capable of use at any place or under any conditions.

I provide within a small case approximating an eight-inch cube two type-wheels and their printing and operating mechanism. Each wheel has upon its periphery a series of similar uniform impression-characters. The characters on one wheel indicate divisions of time, as seconds and quarter-seconds. The characters on the other wheel indicate rotations and partial rotations, as one rotation and tenths of a rotation. The time-indicating wheel is advanced or rotated step by step by an electromagnet in a circuit controlled by a circuit-closer operated by a clock or timepiece in a well-known manner. The speed-indicating wheel is severably connected by a suitable mechanical connection with the moving or rotating shaft to be timed. Such mechanical connection may be a belt and pulleys or a flexible shaft, as well understood. I provide a paper strip or other suitable recording-surface and a constant-speed electric motor to move the strip along at a uniform predetermined rate. There is a suitable device for continuously printing from either or both wheels in parallel lines, so that the number of revolutions of one wheel and the expired time as recorded by the other wheel can be readily compared.

The accompanying drawings illustrate my invention.

Figure 1 is a schematic view showing the relative arrangement of the essential parts of my invention. Fig. 2 is a front elevation of the instrument, and Fig. 3 is an elevation at right angles to Fig. 2.

$w$ is a rotating type-wheel having impression-characters upon its periphery representing seconds and quarter-seconds. $w$ is on a shaft $n$ with a ratchet-wheel 30. This ratchet-wheel 30 is stepped ahead one tooth each quarter-second through the medium of the propelling-pawl $m$, jointed to the shaft $a$, to which the armature A of an electromagnet M is fixed. Magnet M is in a branch circuit 19 20, in which there is a circuit-breaker $c$, closed and opened every quarter-second by the clock C.

$h$ is a holding-pawl for wheel 30.

$p$ is a paper strip supported upon the reel R free to unroll. Strip $p$ passes under roller $r$ and is drawn along at a uniform speed by the friction-wheel $o$ and its companion roller $r'$. $o$ and $r'$ are propelled by the shaft $s$, upon which is fixed the toothed wheel W, meshing with the smaller toothed wheel $x$.

$x$ is fixed to the armature-shaft of a constant-speed motor S.

I have shown an electric motor connected in a branch circuit 21 22 from the main supply-circuit L, containing the dynamo or other generator D.

The motor S may be equipped with a governor $y$, Fig. 3, of any suitable arrangement, or it may be caused to run at constant speed in any well-known manner, the paper being drawn along at a substantially uniform speed. Any constant-speed mechanical motor may be used, however.

$v$ is a type-wheel arranged in close proximity to type-wheel $w$, but entirely free and independent. It is located in a parallel plane. Both wheels $v$ and $w$ print continuously upon the opposite edges of one side of the paper strip $p$.

There is an inking-roller $b$ of well-known construction located above the type-wheels, while the impression-roller $e$ is below the wheels and upon the under side of the paper. The wheel $v$ is on a shaft $q$, supported in a bracket 31 32, having a long bearing B.

X and Y are two plates upon and between which the parts of the apparatus are supported. 5 and 6 are bars held in position by screws which, with the plates X and Y, constitute the framework. A handle H is fixed to the plate Y, while the bracket 31 32 is fixed to the plate X.

E is an electromagnetic motor to be timed or tested. It has a fly-wheel F. The motor E is in the branch circuit 23 24. Assuming that we desire to record the speed of the fly-wheel F, the apparatus is connected in circuit, as shown, and the shaft $q$ of the speed-recording type-wheel $v$ is connected by a flexible shaft $f$ with the fly-wheel F, or it may be connected by any well-known mechanical connection. The type-wheel $w$ is now recording seconds and quarter-seconds and the type-wheel $v$ is simultaneously recording in a parallel line revolutions and tenths of a revolution, and the paper strip after passing under the type-wheels indicates accurately, first, the rate of rotation, and, second, whether the rotations are uniform for any subdivision of a time-unit.

It is to be understood that the paper or record strip $p$ is and must be drawn or fed along, as described, at a speed equal to or greater than the peripheral speed of either of the wheels $v$ or $w$. These wheels $v$ and $w$ make a sliding or scraping or moving impression contact upon the record-strip, but do not in any event hold the strip, and neither singly or jointly do they either accelerate or retard its movement. As a means to more perfectly accomplish this result the impression-characters on the wheels are made of soft rubber or of some soft equivalent material, and the record appears on the paper strip in the form of a series of squares or parallelograms arranged in two parallel lines. If, however, in any given case the paper strip and the peripheral speed of either wheel is the same, then and in that case the record of the wheel in question will appear as a reproduction of the form of the impression-character. A comparison of the number and relative position of these impressions, whether they be lines, squares, or parallelograms, or partly both, is the record required and secured for indicating the speed of rotation sought for.

What I claim, and desire to secure by Letters Patent, is—

1. In a recording speed-indicator the combination of a rotating type-wheel bearing a series of impression-characters indicating equal divisions of time, a motor for moving said wheel continuously and uniformly at a rate indicated by said impression-characters, a second type-wheel bearing a series of similar successive impression-characters indicating partial or entire revolutions, a severable mechanical connection between said wheel and a separate moving machine or apparatus to be timed, means for moving a recording-surface at a uniform rate, and a device for printing continuously from the type-wheels, substantially as described.

2. In a speed-recording indicator the combination of a rotating type-wheel bearing a series of similar impression-characters indicating equal divisions of time, a suitable motor for moving said wheel continuously and uniformly step by step under control of a clock or timepiece, a second type-wheel arranged in a parallel plane bearing a series of similar successive impression-characters indicating rotations and divisions of a rotation, a severable mechanical connection between said wheel and the moving element to be timed, means for advancing a suitable record medium at a uniform rate and a continuously-operating printing mechanism, substantially as described.

3. The combination of two rotating type-wheels located in parallel planes, a motor for rotating one wheel at a uniform predetermined rate, a motor for rotating the second wheel at a rate to be ascertained by comparison, a motor for moving a suitable recording-surface at a uniform rate and means for printing from said wheels continuously, substantially as described.

4. The combination of a rotating type-wheel having a series of similar, uniformly-spaced impression-characters on its periphery, a motor for moving a recording-surface at a uniform predetermined rate, means for connecting and disconnecting said type-wheel with respect to the moving element to be timed, and a continuously-operating printing device, substantially as described.

5. In a speed-recording indicator the combination of two rotating type-wheels located in parallel planes, a constant-speed motor for moving a paper strip continuously and uniformly, an electromagnetic device for advancing one type-wheel step by step controlled by a clock or timepiece through the medium of an electric circuit, a mechanical connection for uniting the second type-wheel to a separate moving element and means for printing from both type-wheels, continuously, substantially as described.

EDWARD P. DECKER.

Witnesses:
FRANCES A. SPERRY,
WALTER S. PLACE.